(12) United States Patent
Bieber et al.

(10) Patent No.: US 8,692,141 B2
(45) Date of Patent: Apr. 8, 2014

(54) LUGGAGE OVERWEIGHT-INDICATING APPRATUS

(76) Inventors: David Bieber, East Greenwich, RI (US);
Richard J. Rekuc, Asbury, NJ (US);
David E. Ringel, Quakertown, PA (US);
Cheung Shik Kui, Samutprakarn (TH)

( * ) Notice: Subject to any disclaimer, the term of this patent is extended or adjusted under 35 U.S.C. 154(b) by 489 days.

(21) Appl. No.: 12/986,803

(22) Filed: Jan. 7, 2011

(65) Prior Publication Data
US 2012/0006600 A1    Jan. 12, 2012

Related U.S. Application Data

(60) Provisional application No. 61/336,102, filed on Jan. 15, 2010.

(51) Int. Cl.
G01G 19/00    (2006.01)
G01G 19/58    (2006.01)
G01G 3/10     (2006.01)
G01G 21/28    (2006.01)
G01G 23/20    (2006.01)

(52) U.S. Cl.
USPC ........... 177/131; 177/148; 177/245; 116/200; 116/215; 116/314

(58) Field of Classification Search
USPC .......... 177/131, 148, 149, 245; 116/200, 215, 116/314
See application file for complete search history.

(56) References Cited

U.S. PATENT DOCUMENTS

| | | | | |
|---|---|---|---|---|
| 2,497,271 A | * | 2/1950 | Peckham | 177/149 |
| 2,518,973 A | * | 8/1950 | Atherton | 190/102 |
| 2,710,083 A | * | 6/1955 | White | 190/102 |
| 2,759,577 A | * | 8/1956 | White | 190/102 |
| 2,937,016 A | * | 5/1960 | Westman | 177/156 |
| 3,090,454 A | * | 5/1963 | Farrar et al. | 177/131 |
| 4,078,625 A | * | 3/1978 | Loeb | 177/233 |
| 4,102,295 A | * | 7/1978 | Crook et al. | 116/281 |
| 4,712,713 A | * | 12/1987 | Karlis et al. | 222/3 |
| 5,118,010 A | * | 6/1992 | Jeans | 222/3 |
| 6,564,509 B1 | * | 5/2003 | Zahner | 47/67 |
| 7,281,615 B2 | * | 10/2007 | Siwak et al. | 190/39 |
| 7,550,684 B2 | | 6/2009 | Kritzler | |
| 2013/0140097 A1 | * | 6/2013 | Zyman Beer et al. | 177/148 |

FOREIGN PATENT DOCUMENTS

WO    WO 03/100360    * 12/2003 ............. G01G 19/58

* cited by examiner

*Primary Examiner* — Randy W Gibson
(74) *Attorney, Agent, or Firm* — Ober, Kaler, Grimes & Shriver; Royal W. Craig

(57) ABSTRACT

An integral weighing device for determining whether the weight of a luggage container and its contents exceed a maximum allowable amount simply by suspending the container by its handle. If the container weighs more than a set amount the integral weighing device provides a visual cue that the container exceeds the predefined weight. The integral weighing device comprises a torsion spring mounted within a housing, and a cord attached to each end of the torsion spring and fed via a guide-way through and out of the housing to an externally accessible grip handle. An indicator arm is rotationally mounted to the housing. When a person lifts the luggage by the grip handle the force is transferred to the torsion spring causing angular deflection toward the indicator arm. If the container exceeds the set weight the indicator arm provides a visual cue that the bag exceeds the predetermined weight.

19 Claims, 8 Drawing Sheets

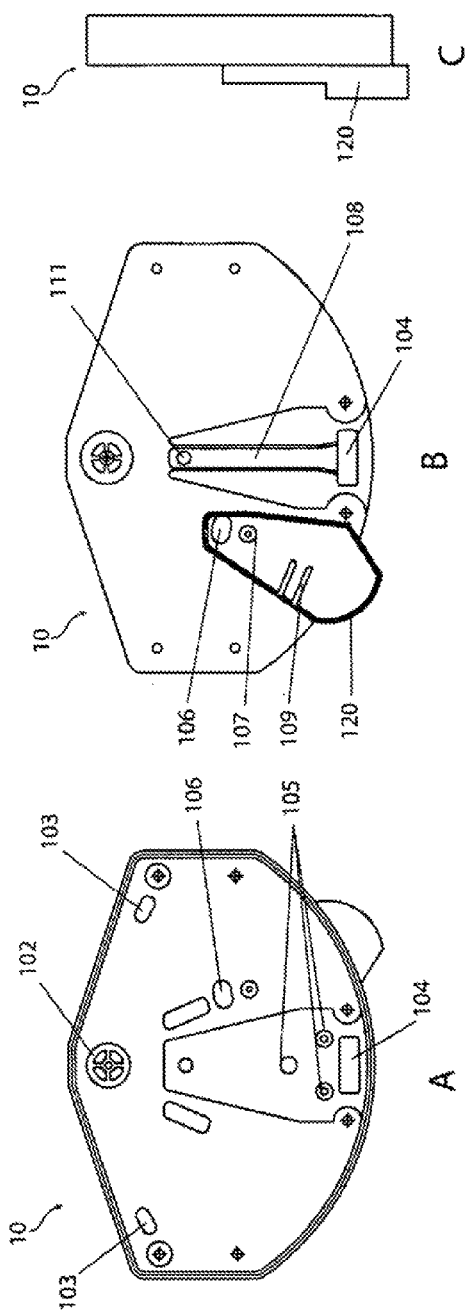
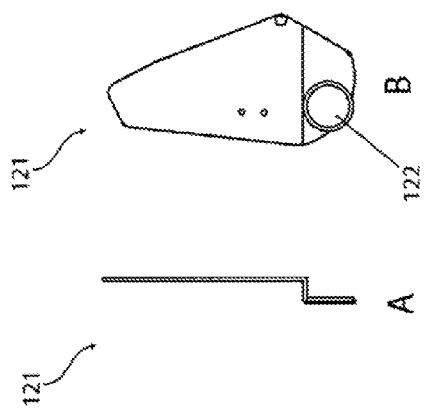
FIG. 4
FIG. 5

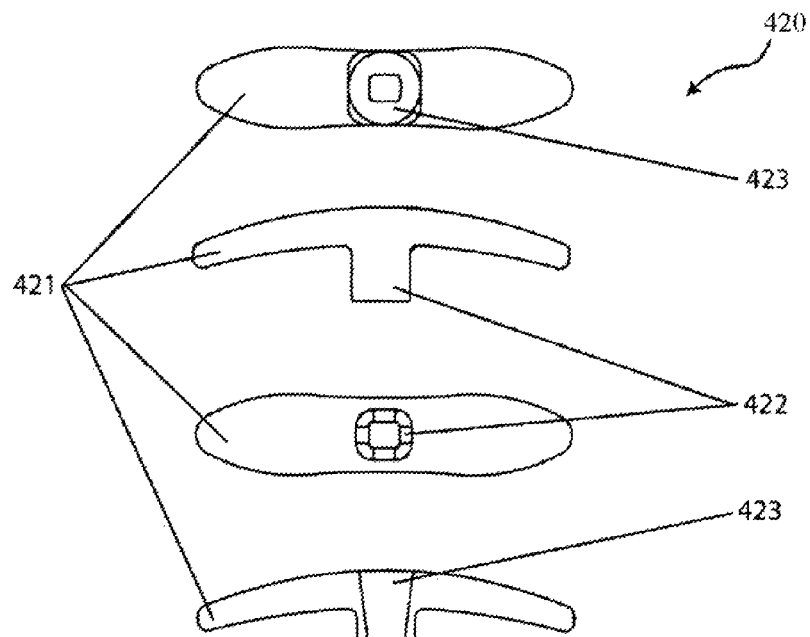
FIG. 7
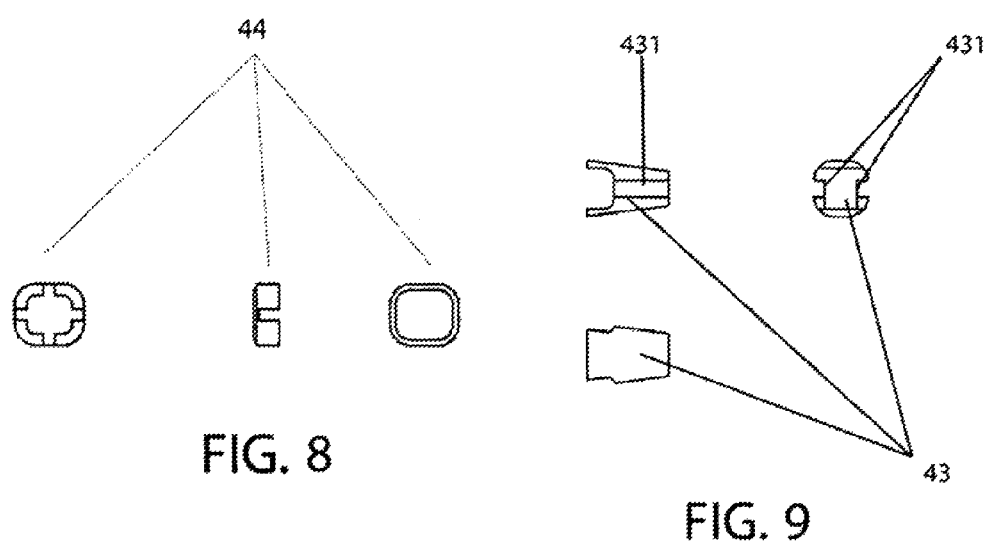
FIG. 8
FIG. 9

LUGGAGE OVERWEIGHT-INDICATING APPRATUS

CROSS REFERENCE TO RELATED APPLICATIONS

The present application derives priority from provisional application 61/336,102 filed on Jan. 15, 2010 which is incorporated herein by reference.

BACKGROUND OF THE INVENTION

1. Field of the Invention

The present invention relates to luggage containers and more specifically luggage incorporating an integral weighing device for determining when the luggage/contents weight exceeds a predetermined threshold.

2. Description of the Background

In the travel industry, the vast majority of transportation carriers such as airlines have implemented checked luggage policies that restrict the weight of luggage containers to a certain maximum weight per bag, for example 50 lbs per bag, to prevent worker injury and vehicle or aircraft overloading. Typically, luggage weight is determined at the ticket counter when passengers and their baggage are checked in for travel. If a piece of luggage exceeds the weight limit, the traveler must reduce the weight of the bag by transferring some of the contents to another luggage container (and potentially incurring fees for additional luggage), or must leave various articles to reduce the weight commonly by simply discarding items or by placing items in their personal vehicle or a locker to be retrieved on their return. This is extraordinarily inconvenient and potentially costly. To avoid this inconvenience and cost, travelers sometimes carry their own scale to weigh their luggage containers before checking them in for travel and, ideally, before leaving home. An example of such personal travel scales is U.S. Pat. No. 7,550,684 to Ronald Kritzler issued Jun. 23, 2009 which discloses a portable handheld electronic scale for precisely this purpose. An audible signal is provided by the Kritzler scale when the measured weight of an article exceeds a set limit.

It would be more convenient to provide a weight-threshold indicator device integral to the luggage container itself, for indicating whether the container exceeds a certain weight.

SUMMARY OF THE INVENTION

It is, therefore, an object of the present invention to provide a weighing device that is integral with a luggage container thereby allowing for quick and easy in-terminal weight checks without need for an external device or scale.

It is another object of the present invention to provide a weighing device that indicates when the luggage container's weight exceeds a certain predetermined amount.

It is yet another object of the present invention to provide an integral weight check device in a modular mechanical configuration with minimal parts for economical manufacturing and assembly.

According to the present invention, the above-described and other objects are accomplished by an integral weighing device fixedly attached to a luggage container. Using the integral weighing device a person lifts the luggage container off the ground by gripping the handle of the device. If the container weighs more than a set amount the integral weighing device provides a visual cue that the container exceeds the predefined weight. The integral weighing device comprises a torsion spring mounted around a protruding shaft within a compact, enclosed housing. A flexible cord is attached to each end of the torsion spring and fed via a guide-way through and out of the housing to an externally accessible grip handle. An indicator arm is rotationally mounted to the housing such that a post of the indicator arm extends into the housing through an aperture. When a person lifts and suspends the luggage by the grip handle the force of gravity pulls the container downward creating a tensile force in the flexible cord equal to the weight of the luggage. This force is transferred to the ends of the torsion spring causing angular deflection toward the inserted indicator engagement post. If the container exceeds the set weight the ends of the torsion spring will be deflected far enough to contact the inserted post thereby causing the indicator arm to rotate and provide a visual indicator that the bag exceeds the predetermined weight. A recessed tension spring may be provided to engage the flexible cord after the cord exits the housing in order to take up cord slack when the cord is not under load.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 4 is a bottom, top, and side view of an alternative embodiment of the housing of the present invention.

FIG. 5 is a side view and top view of a lid used with the housing of the embodiment of FIG. 4.

FIG. 7 is a top, side, bottom, and cross-sectional view of the handle of the handle assembly.

FIG. 8 is a bottom, side, and top view of the handle aperture cover.

FIG. 9 is a side views and a top view of a cord wedge.

DETAILED DESCRIPTION OF THE PREFERRED EMBODIMENT

The present invention is weighing device that may be incorporated into most any conventional luggage container so as to for allow travelers to determine prior to checking the luggage container for travel if the combined weight of the luggage container and its contents exceed a predetermined airline weight restriction. The weighing device is small, modular and suitable for use with any luggage container format including suitcases, bags, duffels, trunks, garment bags, briefcases, and any other portable receptacle that can carry items. The weighing device may be fixedly attached on most any surface of a luggage container and preferably substantially in line with an anticipated center of mass of the packed luggage. The device is modular and may be mounted recessed in the surface of a luggage for aesthetics, yet partially exposed for visibility and ease of use, as will become clear in view of the description of the invention provided herein.

Figure 1:
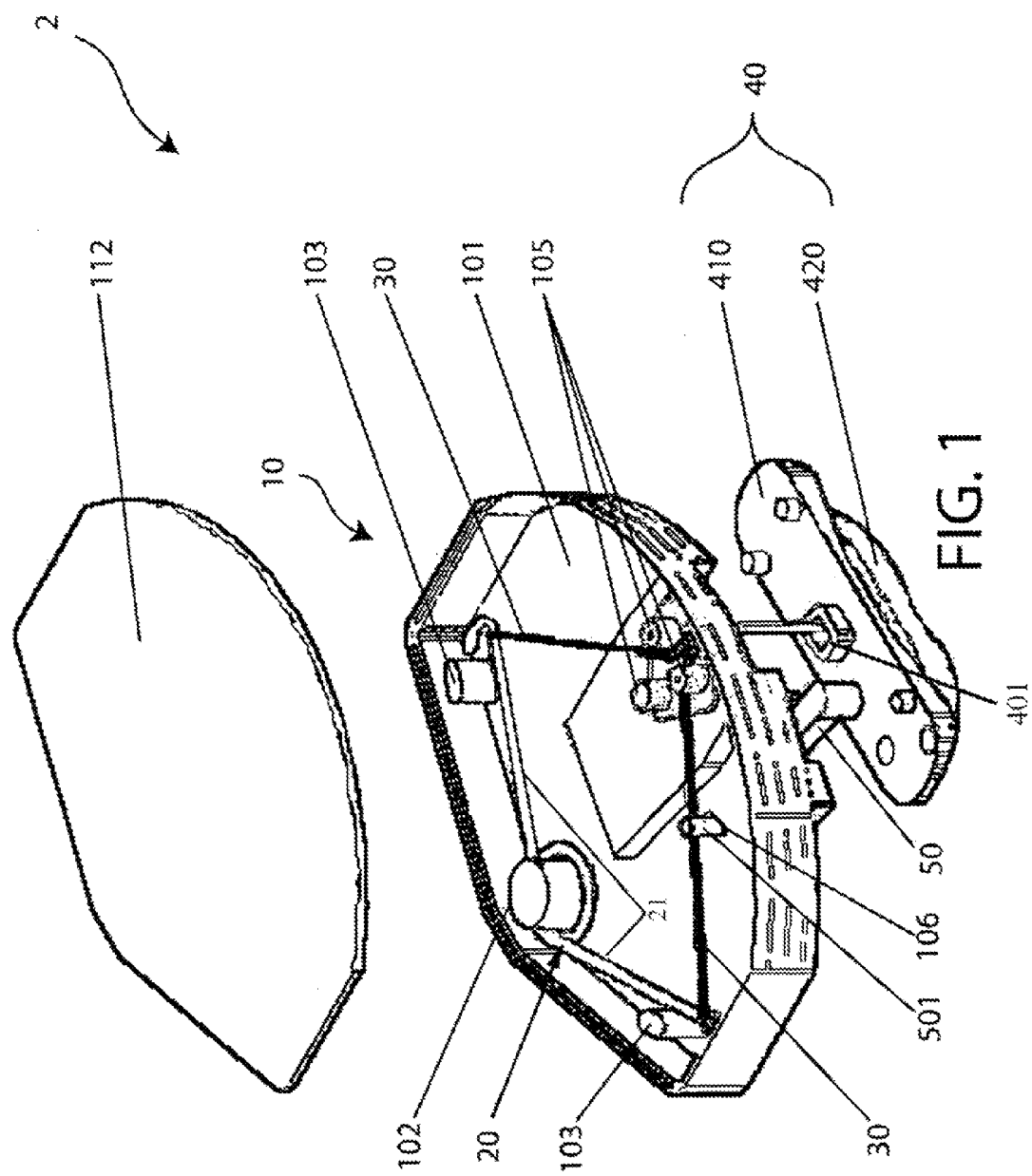
FIG. 1 is a partially exploded perspective view of an embodiment of the weighing device from below.
Figure 2:
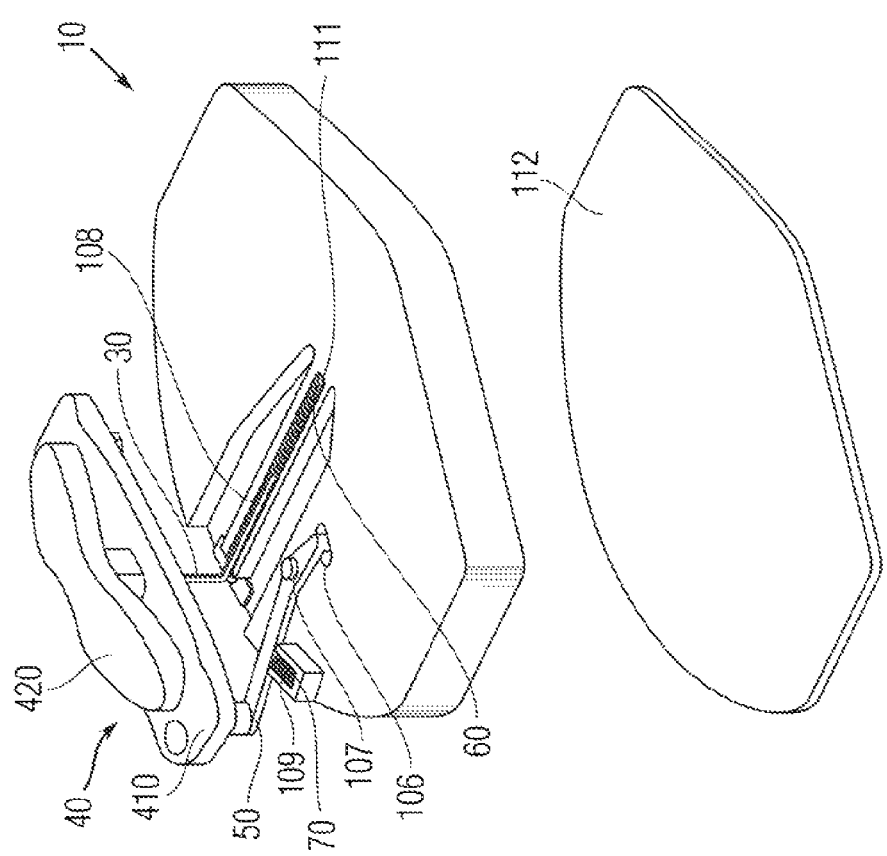
FIG. 2 is a partially exploded perspective view of the weighing device from above.
Figure 3:
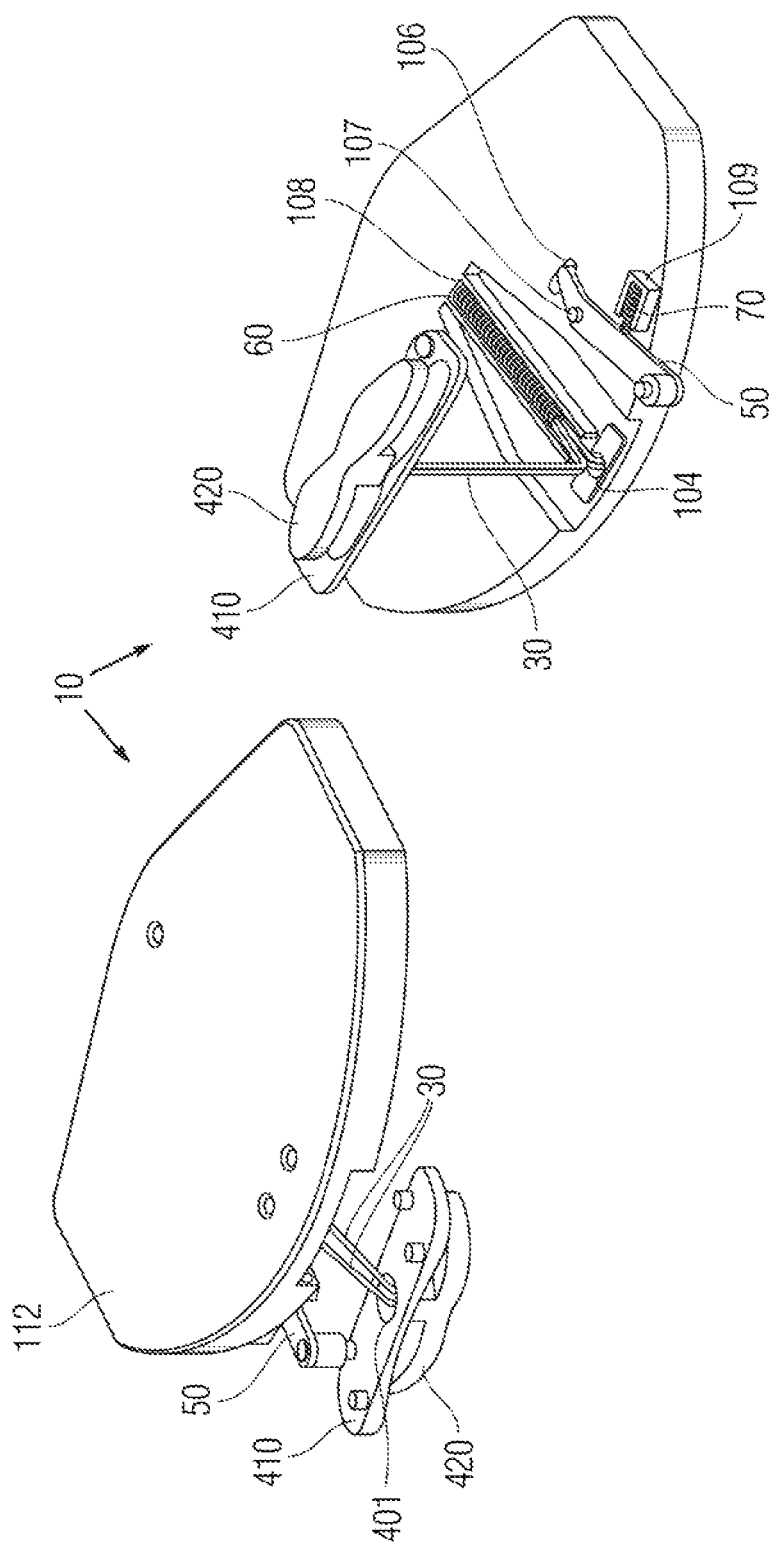
FIG. 3 is the perspective views of the assembled weighing device from both the above and below.
Figure 6:
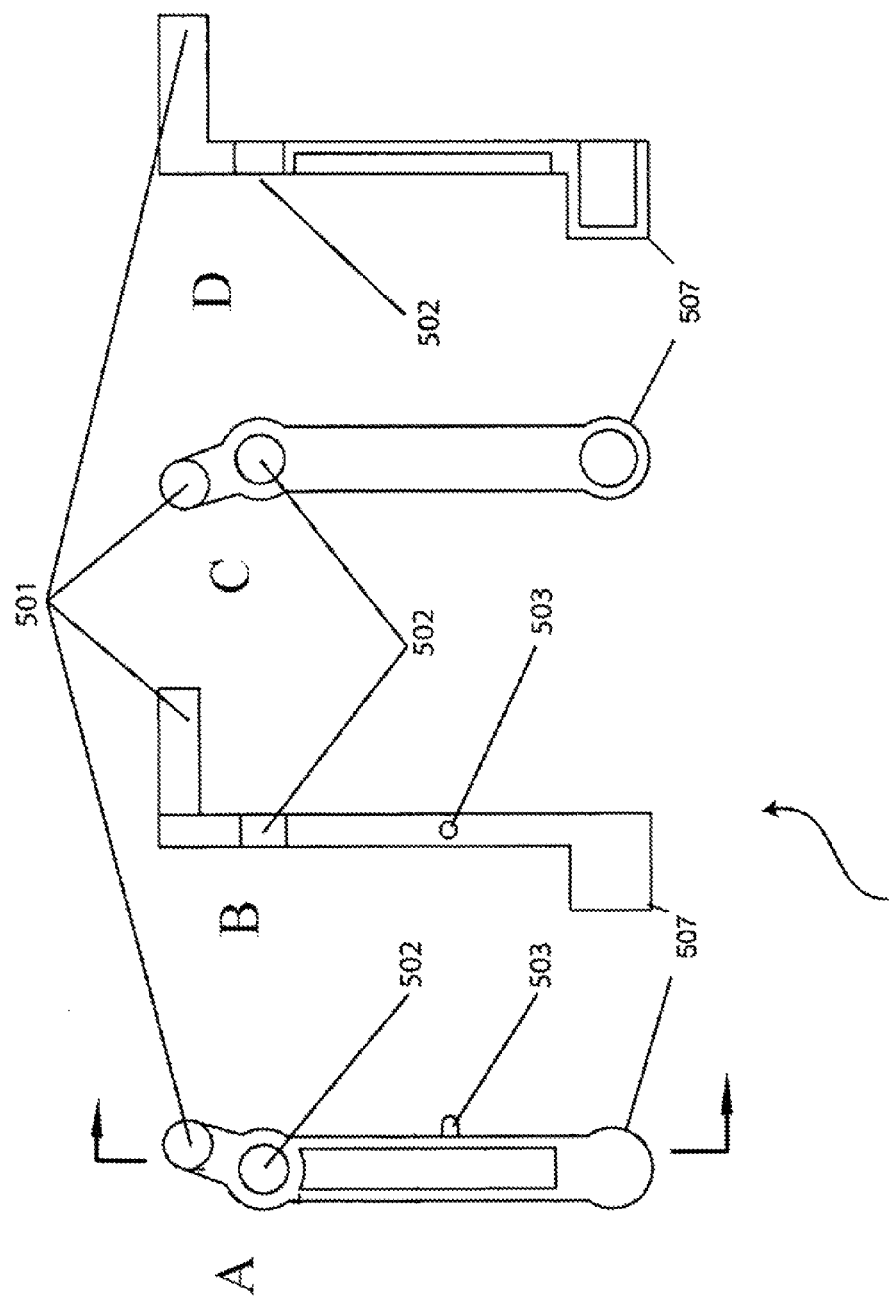
FIG. 6 is a top, side, bottom, and cross sectional view of the indicator arm.

FIG. 1 is a partially exploded perspective view of a preferred embodiment of a weighing device 2 according to the present invention, as seen from the underside. FIG. 2 is a partially exploded perspective view of the weighing device 2 from above. FIGS. 3a and 3b are perspective views of the assembled weighing device 2 as seen from the underside and topside, respectively. With collective reference to FIGS. 1-3, the weighing device 2 comprises a housing 10 defining an enclosed hollow cavity 101 which contains and protects the device's internal components as will be described. The housing 10 preferably comprises an integrally molded cover with surrounding sidewalls defining an enclosure 101 and a separate bottom floor 112 that seals the enclosure 101 and yet allows a user to selectively access the inner device components. The bottom floor 112 may be removable by snap-fit, screws or the like, or may be bonded to enclosure 101 as matter of design choice. The housing 10 includes a preferably cylindrical post or shaft 102 that protrudes into the hollow cavity 101 and around which a helical torsion spring 20 is mounted. The torsion spring 20 includes opposing legs 21 that extend away from and on either side of the helical coil 22 of the spring 20. The torsion spring is preferably oriented on the shaft 102 such that the diameter of the helical coil 22 is reduced when the legs are deflected, as will be described, in order to tighten the engagement of the loaded coil 22 with the post 102. The shaft 102 is preferably sized to conform to the helical coils 22 which encircle the shaft 102 for stability.

Also protruding into the hollow cavity 101 is a pair of posts 103, each serving as a stop or "home" position for the respective legs 21 of the torsion spring 20 when the device is not in use. It is preferred that the coil 21 not be in a totally unloaded state when no force is applied to the spring 20 by the cord 30, so as to maintain some contact with the post 102. Consequently, the legs 21 preferably remain slightly biased against the posts 103 to maintain a minimal load on the coil 22. Attached to each of the legs 21 is a flexible cord 30. The legs 21 may be formed with a hook end (as shown) or similar anchor to provide a point of attachment for the cord which may be attached at the ends of the legs 21 (as shown) or at any intermediate point along the length of the legs 21. The cord 30 may further be adjustably attached to the legs 21 such that its position can be altered and set prior to use in order to adjust the reactive leverage when pulling the legs 21 of the spring 20. The flexible cord 30 may be wire, band, strand, polymer line, cable, rope, chain, or any other suitable non-stretchable but compliant cord capable of withstanding the tensile force asserted during operation. The cord 30 may be a single strand that passes through an aperture 104 in the housing 10 and loops through a handle assembly 40 before returning to the opposite leg 21 of the spring 20. Alternately, the cord 30 may be comprised of two elements that are independently joined at or by the handle 40 to effectively function as a single cord.

Figure 13:
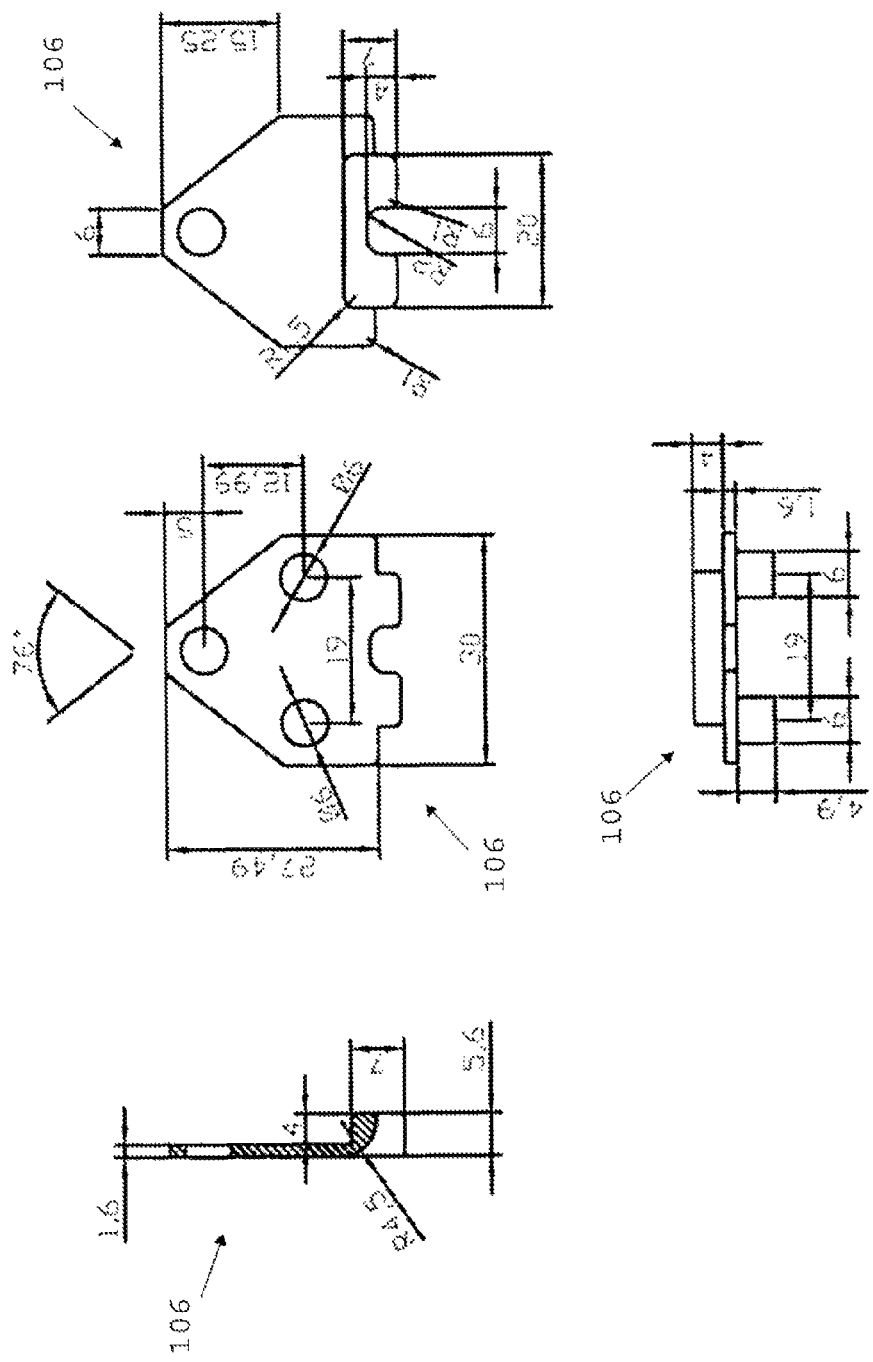
FIG. 13 is a view of a slide plate that fits over the plurality of alignment posts.

In the illustrated embodiment, the angle formed between the cord 30 and the legs 21 of the torsion spring 20 in their home position is determined by a plurality of alignment posts 105 that extend from the housing 10 floor into the cavity 101. The cord alignment posts 105 are disposed between the aperture 104 and the ends of the torsion spring 20 so as to define a guide-way or path for the cord 30 within the housing 10. A slide plate 106 (not pictures in FIG. 1, see FIG. 13) may be fitted over the posts 105 to maintain the cord 30 in the guideway.

As seen in FIG. 2, an indicator arm 50 is pivotally mounted on a mounting shaft 107 protruding exteriorly from the floor of the housing 10. FIGS. 6A through 6D are top, side, bottom, and cross-sectional views, respectively, of indicator arm 50. The indicator arm 50 comprises an indicator 507 at one end, an engagement tab 501 at the other end and an aperture 502. The indicator arm 50 is rotationally mounted to the housing 10 by insertion of the post 107 within the aperture 502 and insertion of engagement tab 501 within aperture 106 of the housing. The mounting shaft 107 is preferably a detent post that snaps into aperture 502, the latter being sized to fit closely around the mounting shaft 107 to allow rotational movement while still retaining the shaft 107 thereon. The indicator arm 50 extends on one side of the aperture 502 to the indicator 507, and extends on the other side to an engagement tab 501 which traverses the floor of the housing 10 and extends into the cavity 101 via an aperture 106 through the housing 10. One skilled in the art will recognize the position of the indicator 507 and engagement tab on the arm relative to one another and to the aperture 502 may be varied in keeping with the operative principles described herein, and indicator 507 may take the shape of a colored flag or ball, or anything that would indicate through the window when the weight is met or exceeded. Referring back to FIG. 1, indicator arm 50 and aperture 106 are positioned so that the engagement tab 501 enters the cavity 101 so as to be in the path of deflection of an arm of the torsion spring 20.

Referring back to FIG. 1, a handle assembly 40 is provided that is externally accessible to the luggage. The handle assembly comprises a base 410 and a handle 420. The base 410 is fixedly attached to an external surface of the luggage container but is separated a distance from the housing 10 so as to allow the indicator arm 50 be positioned in between. The cord 30 passes on its way from the legs 21 of the torsion spring 20 through the base 410 and is affixed to the handle 420.

Figure 10:
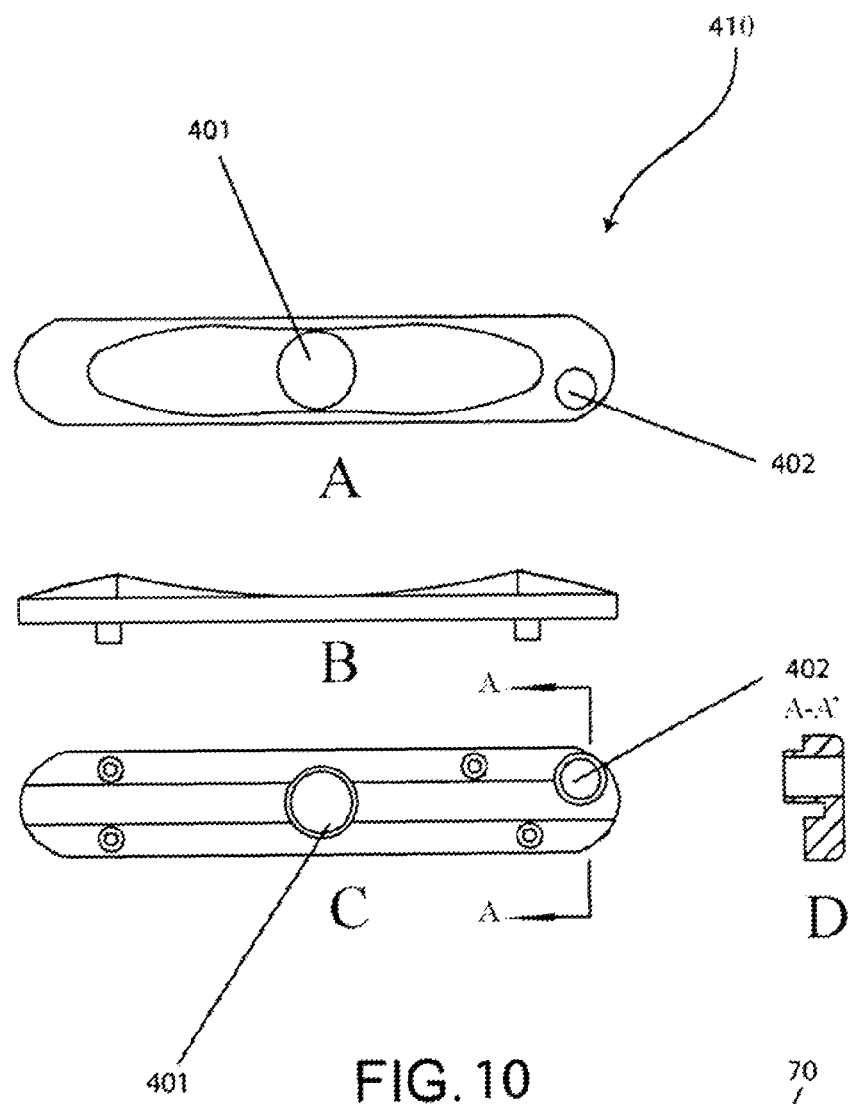
FIG. 10 is a top, side, bottom, and cross-sectional view of the base of the handle assembly.

With additional reference to FIG. 10(A-D), the base 410 is a surface mount member having a central aperture 401 through which the cord 30 passes on its way from the legs 21 of the torsion spring 20 to the handle 420. The base 410 also has a viewing aperture 402 for viewing the indicator 507 of the interspaced indicator arm 50 when the indicator 507 is pivoted into alignment with the viewing aperture 402 during overweight conditions. The viewing aperture 402 may be covered with a transparent or opaque-colored window that is friction fit within the aperture 402 for viewing the indicator 507.

With reference to FIGS. 7, 8 and 9, the handle 420 comprises a grip portion 421 which is shaped for grasping by a hand of a user, and a stem 422. An aperture 423 is provided through both the grip portion 421 and the stem 422, the aperture 423 having a decreasing cross-sectional area as it extends downward from the grip portion 423 though the stem 422. As seen in FIG. 9, a wedge 43 is sized to closely fit within aperture 423 and has two vertically aligned, peripheral grooves 431 through which the cord 30 passes to secure the cord to the handle 420. The wedge 43 is secured from being pulled through the aperture 423 by tension on the cord 30 by virtue of the fact that its maximum dimension is greater than the minimum dimension of the aperture 423. In the illustrated embodiment, the aperture 423 and wedge 43 are a cooperatively-tapered square form (geometrically speaking a quadrilateral frustum) but any tapered form with the disclosed grooves 431 will suffice to secure the cord 30 to the handle 420 by feeding the cord up through one groove, over the top of the wedge 43 and back down the opposing groove. In a preferred embodiment the cord 30 terminates above the wedge 43 in a knot or is attached to an object that is larger than the grooves 431. Additionally, the aperture 423 may be capped with a friction fit cover 44 as shown in FIG. 8. In certain other embodiments, the stem 422 of the handle 420 is further shaped to conform to the aperture 401 in the base 410 such that the stem 422 slides into and is received by the aperture 401 when the device is not in use.

The weighing device 2 may be fixedly attached to the luggage container in a variety of orientations. Preferably, the housing 10 is attached to the interior of the luggage container in a manner that still allows rotational movement and viewing of the indicator arm 50, while the handle assembly 40 is attached to the exterior of the container for access by the traveler. Alternatively, the housing 10 may be attached to the exterior of the container, and the handle assembly 40 may be attached directly to the housing 10. In either orientation, the handle 420 remains easily accessible to the traveler.

In operation, the integral weighing device 2 indicates whether the weight of the luggage container exceeds a certain predetermined weight. When a user lifts and suspends the luggage by the grip handle 420 the force of gravity pulls the container downward creating a tensile force in the flexible cord 30 equal to the weight of the luggage. This force is transferred to the legs 21 of the torsion spring 20 by the cord 30 which travels downward from the handle 42, through the cord aperture 401 in the base 420 and into the cavity 101 of the housing 10 via the aperture 104. The cord 30 continues around the alignment posts 105 which redirect it to (at least one of) the legs 21 of the torsion spring 20 where it causes angular deflection of the leg 21 toward the indicator engagement tab 501 which extends into the cavity 101 from outside the housing 10. If the container exceeds the set weight, the leg of the torsion spring 20 will be deflected far enough to contact the inserted engagement tab thereby causing the indicator arm 50 to rotate about the mounting shaft 107 and aligning the indicator 507 with the viewing aperture 402 in the base 410 of the handle assembly 40 thereby providing a visual indicator to the user that the bag exceeds the predetermined weight.

Figures 11, 12:
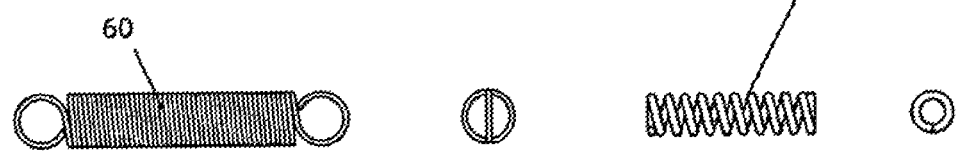
FIG. 11 is a view of the tension spring.
FIG. 12 is a view of the compression spring.

With additional reference to FIG. 12, in order to ensure that the indicator 507 is not falsely displayed in the viewing aperture, a helical compression spring 70 is provided to bias the indicator arm 50 into a non-pivoted, home position in which the indicator 507 is not visible in the viewing aperture. The compression spring 70 is seated in a raised channel 109 formed on the surface of the housing 10 proximal to the mounted indicator arm 50 and open on one end to the indicator arm 50. For stability and in order to maintain proper alignment and contact, the exposed end of the spring 70 closely receives within its coil a pin 503 that protrudes from the side of the indicator arm. The compression spring 70 prevents the indicator arm from moving when an insufficient force is applied to the handle and, by extension, to the torsion spring 20 via the cord 30. In an alternate embodiment, the compression spring 70 is held within the channel 109 by a removable cover that fits around the periphery of the channel. The biasing force of the compression spring 70 is very small as compared to the weight of the luggage container such that it has negligible impact on the weight indicated by the device. Further, the biasing force of the spring 70 can be accounted for when selecting the torsion spring 20.

As already observed, when the device is not in use the legs 21 of the torsion spring 20 rest in their home position on posts 103 within the hosing 10 and the grip handle 420 rests on the base 410 with the stem engaged in the aperture 401. In such a configuration the handle 420 will not be securely retained in the base 410 without at least some tension on the cord 30. Tension for this purpose can be provided by the torsion spring 20 by positioning the posts 103 such that there is at least a small amount of tension on the cord 30 at all times. Alternately, as seen in FIG. 11, a helical tensioning spring 60 may be provided to take up any slack in the cord 30 when the device is not in use and the legs are at rest against the posts 103. Referring back to FIGS. 2 and 3, a recessed channel 108 is provided in the exterior surface of the housing 10 in which to locate the tensioning spring 60 of FIG. 11. One end of the tensioning spring 60 is fixedly attached to the housing 10 as, for example, by an attachment shaft 111 that extends from an end of the recessed channel 108 as illustrated. The opposing end of the tensioning spring 60 is configured to slideably receive and retain the cord 30, such as for example by a formation of a half loop, full loop, long round-end hook, or a coned end with a swivel hook through which the cord 30 is passed as it proceeds from the cord aperture 401 of the base 41 and before it enters the cavity 101 via the aperture 104 of the housing 10 on its way to the torsion spring 20. Slideably engaging the cord 30 with the tension spring 60 removes any excess slack from the cord 30 while simultaneously allowing the handle 420 to be extended. During operation, the initial lifting of the handle serves to take up slack in the cord 30 and extends the tensioning spring 60 in the process. Once any slack in the cord 30 is removed the tensile force in the cord is transferred to the torsion spring 20. As with the compression spring 70, the force applied on the cord 30 by the tensioning spring 60 is very small as compared to the weight of the luggage container such that it has negligible impact on the weight indicated by the device 2.

In an alternate embodiment of the present invention, an enclosure is provided as part of the housing 10 to ensure that nothing interferes with rotation of the indicator arm 50. With reference to FIGS. 4A, B and C which are bottom, top, and side views of such an alternative embodiment with enclosure, respectively and FIGS. 5A and B which are side and top views, respectively, of a cover 121 used with the enclosed embodiment of FIG. 4. The enclosure is formed by extending a wall 120 from the exterior surface of the housing 10. The enclosure surrounds the aperture 106, mounting shaft 107 (including indicator arm 50 mounted thereon), and channel 109. The wall 120 is shaped to form an enclosure that allows indicator arm 50 to rotate when engaged by the torsion spring 20. An indicator arm cover 121 may be provided to complete the enclosure, the shape of indicator arm cover 121 corresponding to the shape of wall 120. The cover 121 is preferably selectively removable to allow access to the enclosure and further preferably fits closely against an inwardly protruding flange at the top of the retaining wall 120. The cover 121 includes an aperture 122 to allow a user to see the indicator 507 of the indicator arm 50. The enclosure precludes debris or anything else from preventing rotation of the indicator arm 50.

The pre-set weight at which the device indicates an overweight condition can be varied by a variety of design modifications. The angular deflection of the ends of the torsion spring 20 is dependent on the applied moment and the spring rate. The applied moment can be varied by attaching the cord 30 at different points along the legs 21 of the torsion spring or at different orientation (i.e. angle) relative to legs 21. The spring rate is also dependent on the torsion spring 20 physical structure and material composition which can be selected at the time of manufacture. If the desired indicated weight is 50 pounds, a torsion spring 20 with the appropriate spring rate should be chosen so that ends of the legs 21 of the torsion spring 20 do not contact the engagement tab 501 unless the luggage container weighs 50 pounds or more, and this is easily quantitatively determined.

In some situations it would be desirable for the present invention to enable the user to determine if the combined weight of the luggage container and its contents exceed more than one predetermined airline weight restriction, such as for example where airlines having one weight restriction for domestic routes and a second, different weight restriction for international travel routes. Alternate embodiments of the present invention provide such functionality with minimal modification as will be described.

In a first such alternate embodiment the two legs 21 of the torsion spring 20 may actuate two different but identical weight indicators at two differing desired set points. Such an embodiment may include a second indicator arm 50/viewing window positioned as a mirror image to that described above so as to be engaged by the second leg of the torsion spring 20. The second indicator arm may be formed or positioned so as to require greater deflection of the second leg thereby indicating a higher or lower luggage weight. Alternately the cord 30 may engage the second leg at a point closer to post 102 so as to require more force (and hence greater weight) to achieve the same amount of deflection of the leg. Lastly, an additional second spring of greater spring rate may be mounted concentrically on post 102, or on a second post, to provide a second indicator arm to achieve a two-level weight indicator. If desired, in the two-level weight indicator embodiments, a split or nested handle may be employed, with two different threshold weights marked on the corresponding handle sections. The two independent handle sections may be separately engaged to an arm of the torsion springs(s) 20 by a cord 30 (or if a second spring is employed, the two independent handle sections being separately engaged thereto) such that the two independent handle sections register in separate viewing windows marked to indicate two different weight thresholds in order to independently test the weight of the luggage against that weight marked on the corresponding handle section.

In a second such alternate embodiment a single leg of the torsion spring may be deflected a first distant to indicate a first weight threshold has been exceeded via engagement with an indicator arm (as in the preferred embodiment above), and deflected a second, additional distance to indicate a second weight threshold has been exceeded by further engagement with and, for example, additional rotation of, the single indicator arm.

In yet a third such alternate embodiment a selector switch/slide may be provided, externally accessible through the housing 10, and movable to slide the point of engagement of the cord 30 with the leg 21 between a first and a second position on the leg 21 so as to require a selectable first and second weight threshold to achieve the deflection necessary actuate the single indicator arm as in the preferred embodiment.

It should now be apparent that the above-described device facilitates quick and easy in-terminal weight checks without need for an external scale, and can be incorporated into most luggage or other containers due to its modular and minimalist mechanical configuration for economical manufacturing and assembly. Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. In combination with a luggage container defining a volume for holding contents, a weight-indicating device for indicating when the weight of said luggage container and its contents exceeds a predetermined weight, said weight-indicating device further comprising:
    a housing affixed to said luggage container, said housing defining an interior space therein and further comprising a post extending into said space;
    a torsion spring comprising a coil seated on said post and at least one leg extending from said coil;
    at least one cord affixed at a first end to said at least one leg of said the torsion spring;
    a handle assembly comprising a base affixed to an external surface of said luggage container, and a handle movable relative to said base, a second end of said at least one cord being affixed to said handle; and
    an indicator mounted in said housing within a deflection path of the at least one torsion spring leg and movable from a first position when said predetermined weight is exceeded to a second position wherein said indicator is visible externally to said luggage container.

2. The weight-indicating device of claim 1, wherein said at least one leg of said torsion spring is deflected by tensile force developed in said cord by gravity when said luggage container is suspended by said handle.

3. The weight-indicating device of claim 1, wherein said indicator arm is pivotally mounted to said housing and further comprises a tab disposed within said interior space in a deflection path of said at least one torsion spring leg, and an indicator, said indicator arm being rotatable from a first position when said predetermined weight is exceeded to a second position wherein said indicator is visible externally to said luggage container.

4. The weight-indicating device of claim 3, wherein deflection of said at least one torsion spring leg causes said leg to engage said tab and pivots said indicator arm into said second position when said tensile force meets or exceeds said predetermined weight for said luggage container and its contents.

5. The weight-indicating device of claim 1 further comprising a biasing spring engaged to said housing and acting on said indicator arm to bias said arm to said first position.

6. The weight-indicating device of claim 1 further comprising a tensioning spring engaged to said housing, said tensioning spring being slideably engaged to said cord so as to maintain said cord in tension when said device is not in use.

7. The weight-indicating device of claim 1 wherein said least one leg extending from said coil comprises two legs and said at least one cord comprises two cords, a first end of the second cord attached to the second leg and extending there from to a second end affixed to said handle, whereby both of said torsion spring legs are deflected by the tensile force developed in said cords when said luggage container is suspended by gravity from said handle.

8. The weight-indicating device of claim 7 wherein said second leg has a spring constant greater than a spring constant of the first said leg, said luggage container further comprising a second indicator arm pivotally mounted to said housing; said second indicator arm comprising a second tab disposed within said interior space in a deflection path of said second leg and a second indicator, said second indicator arm rotatable from a first position when a second predetermined weight is exceeded to a second position wherein said second indicator is visible externally to said luggage container.

9. The weight-indicating device of claim 7 wherein said second cord engages said second leg at appoint closer to said post than the point at which said first cord engages said first leg, said luggage container further comprising a second indicator arm pivotally mounted to said housing; said second indicator arm comprising a second tab disposed within said interior space in a deflection path of said second leg and a second indicator, said second indicator arm rotatable from a first position when a second predetermined weight is exceeded to a second position wherein said second indicator is visible externally to said luggage container.

10. The weight-indicating device of claim 1 wherein said indicator is further rotatable from said second position when a second predetermined weight greater than the first predetermined weight is exceeded to a third position whereby a second indicator is visible externally to said luggage container.

11. The weight-indicating device of claim 1 wherein said housing is affixed to said luggage container within said volume, and wherein said base further comprises a viewing aperture, said indicator visible within said viewing aperture when said leg engages said tab.

12. A device to determine whether the weight of a luggage container and its contents exceeds a predetermined weight, comprising:
a housing affixed to said luggage container, said housing defining an interior space therein and further comprising a post extending into said space;
a torsion spring, said torsion spring mounted on said post and having at least one leg extending there from;
at least one cord affixed at a first end to said at least one leg of said the torsion spring;
a handle assembly affixed to an external surface of said luggage container, said handle assembly comprising a base and a handle, said handle operatively engaged with said base and affixed to a second end of said at least one cord; and
an indicator arm pivotally mounted to said housing;
said indicator arm comprising a tab disposed within said interior space in a deflection path of said leg and an indicator, said indicator arm rotatable from a first position when said predetermined weight is exceeded to a second position wherein said indicator is visible externally to said luggage container;
whereby said at least one leg of said torsion spring is deflected by the tensile force developed in said cord by gravity when said luggage container is suspended by said handle, and whereby said deflection is sufficient for said leg to engage said tab and thereby cause said arm to pivot into said second position when said tensile force meets or exceeds said predetermined weight for said luggage container and its contents.

13. The luggage container of claim 12 further comprising a biasing spring engaged to said housing and acting on said indicator arm to bias said arm to said first position.

14. The luggage container of claim 12 further comprising a tensioning spring engaged to said housing, said tensioning spring slideably engaged to said cord so as to maintain said cord in tension when said device is not in use.

15. The luggage container of claim 12 wherein said least one leg extending from said coil comprises two legs and said at least one cord comprises two cords, a first end of the second cord attached to the second leg and extending there from to a second end affixed to said handle, whereby both of said legs of said torsion spring are deflected by the tensile force developed in said cords by gravity when said luggage container is suspended by said handle.

16. The luggage container of claim 15 wherein said second leg has a spring constant greater than a spring constant of the first said leg, said luggage container further comprising a second indicator arm pivotally mounted to said housing; said second indicator arm comprising a second tab disposed within said interior space in a deflection path of said second leg and a second indicator, said second indicator arm rotatable from a first position when a second predetermined weight is exceeded to a second position wherein said second indicator is visible externally to said luggage container.

17. The luggage container of claim 15 wherein said second cord engages said second leg at appoint closer to said post than the point at which said first cord engages said first leg, said luggage container further comprising a second indicator arm pivotally mounted to said housing; said second indicator arm comprising a second tab disposed within said interior space in a deflection path of said second leg and a second indicator, said second indicator arm rotatable from a first position when a second predetermined weight is exceeded to a second position wherein said second indicator is visible externally to said luggage container.

18. The luggage container of claim 12 wherein said indicator is further rotatable from said second position when a second predetermined weight greater than the first predetermined weight is exceeded to a third position whereby a second indicator is visible externally to said luggage container.

19. The luggage container of claim 12 wherein said housing is affixed to said luggage container within a storage volume of said container and wherein said base further comprises a viewing aperture, said indicator visible within said viewing aperture when said leg engages said tab.

* * * * *